United States Patent
Kumar et al.

(10) Patent No.: US 11,965,579 B2
(45) Date of Patent: Apr. 23, 2024

(54) WIND TURBINE DAMPER ARRANGEMENT

(71) Applicant: Siemens Gamesa Renewable Energy A/S, Brande (DK)

(72) Inventors: Upendra Kumar, Uttar Pradesh (IN); Adam Lord, Hamburg (DE); Madhup Tiwari, Bangalore (IN); Christian Vogelsang, Hamburg (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 260 days.

(21) Appl. No.: 17/233,944

(22) Filed: Apr. 19, 2021

(65) Prior Publication Data
US 2021/0332866 A1 Oct. 28, 2021

(30) Foreign Application Priority Data
Apr. 23, 2020 (EP) .................................. 20170978

(51) Int. Cl.
*F16F 7/10* (2006.01)
*E04B 1/98* (2006.01)
(Continued)

(52) U.S. Cl.
CPC .............. *F16F 7/1034* (2013.01); *E04B 1/98* (2013.01); *F03D 13/20* (2016.05); *F03D 80/00* (2016.05); *F05B 2260/301* (2013.01); *F05B 2260/964* (2013.01); *F16F 2222/08* (2013.01); *F16F 2230/0005* (2013.01)

(58) Field of Classification Search
CPC ........ F03D 13/20; F03D 80/00; F03D 7/0298; F03D 7/0296; F03D 7/0302; E04B 1/98; E04B 2009/186; F16F 7/1034; F16F 2222/08; F16F 2230/0005; F16F 7/10; F05B 2260/96; F05B 2260/964
See application file for complete search history.

(56) References Cited

U.S. PATENT DOCUMENTS

| 11,353,006 B2 * | 6/2022 | Munk-Hansen ...... F03D 7/0296 |
| 2006/0147306 A1 | 7/2006 | Zheng et al. |

(Continued)

FOREIGN PATENT DOCUMENTS

| CN | 203641390 U | 6/2014 |
| CN | 204186539 U | 3/2015 |
| EP | 1677003 A2 | 7/2006 |

*Primary Examiner* — Topaz L. Elliott
*Assistant Examiner* — Ryan C Clark
(74) *Attorney, Agent, or Firm* — Schmelser, Olsen & Watts LLP

(57) ABSTRACT

Provided is a wind turbine, including a tower and a damper module, especially a slosh damper module arranged in the tower, which damper module includes a frame with at least two elongated first frame ends at one side of the frame and at least two elongated second frame ends at the opposite side of the frame, which first and second frame ends are fixed to first and second fixation elements arranged at an inner wall of the tower, wherein the first frame ends are immovably fixed to the fixation elements while the second frame ends are fixed sliding relative to the fixation elements, wherein the first and second fixation elements are first and second plates fixed to the and extending horizontal from the inner wall, on which the first and second frame ends comprising flat support areas rest.

17 Claims, 6 Drawing Sheets

(51) Int. Cl.
  *F03D 13/20*    (2016.01)
  *F03D 80/00*    (2016.01)

(56)     References Cited

U.S. PATENT DOCUMENTS

| | | | |
|---|---|---|---|
| 2008/0145222 | A1 | 6/2008 | Schellings |
| 2012/0121413 | A1* | 5/2012 | Rodriguez Tsouroukdissian ........ F03D 7/02 416/31 |
| 2013/0174508 | A1 | 7/2013 | Butts et al. |
| 2013/0183162 | A1* | 7/2013 | Cruden .................. F03D 80/50 416/244 R |
| 2016/0215754 | A1* | 7/2016 | Seidel .................. E04H 9/0215 |
| 2018/0017125 | A1* | 1/2018 | Amdisen ................ F03D 13/20 |
| 2019/0154099 | A1* | 5/2019 | Macchietto ............ F16F 7/1022 |
| 2020/0011391 | A1* | 1/2020 | Allen ...................... F16F 1/027 |
| 2020/0284315 | A1* | 9/2020 | Rumler .................. F03D 13/40 |
| 2020/0324883 | A1* | 10/2020 | Smith .................... F16F 7/1034 |
| 2020/0332548 | A1* | 10/2020 | Mortensen ............ E04H 9/0215 |
| 2021/0010286 | A1* | 1/2021 | Ma ........................ F16F 7/1028 |
| 2021/0017960 | A1* | 1/2021 | Ma ........................ F03D 13/10 |
| 2021/0172490 | A1* | 6/2021 | Starossek ................ F16F 7/1005 |
| 2021/0254605 | A1* | 8/2021 | Madsen ................ F16F 7/1005 |
| 2021/0301789 | A1* | 9/2021 | Scheller ................ E04H 9/0215 |
| 2022/0049682 | A1* | 2/2022 | Madsen ................ F03D 80/88 |

* cited by examiner

WIND TURBINE DAMPER ARRANGEMENT

CROSS-REFERENCE TO RELATED APPLICATIONS

This application claims priority to European Application No. 20170978.9, having a filing date of Apr. 23, 2020, the entire contents of which are hereby incorporated by reference.

FIELD OF TECHNOLOGY

The following relates to a wind turbine, comprising a tower and a damper module, especially a slosh damper module arranged in the tower, which damper module comprises a frame with at least two elongated first frame ends at one side of the frame and at least two elongated second frame ends at the opposite side of the frame, which first and second frame ends are fixed to first and second fixation means arranged at an inner wall of the tower, wherein the first frame ends are immovably fixed to the fixation means while the second frame ends are fixed sliding relative to the fixation means.

BACKGROUND

A wind turbine usually comprises a tower installed damper module, preferably a slosh damper module. The damper module is fixed to the inner wall of the tower, so that any movement of the tower is directly transferred to the damper module which is adapted to dampen the movement or vibrations etc. For connecting the damper module to the tower, the damper module comprises a frame, which is for example built by several elongated beams extending from one side of the module to the other side. The frame comprises at each frame side at least two elongated first frame ends and at least two elongated second frame ends at the opposite side. These elongated frame ends are for example the ends of the respective frame beams. The frame ends are fixed to respective first and second fixation means arranged at the inner wall of the tower. These fixation means are firmly fixed to the tower wall, so that the frame ends can be firmly fixed to these fixation means and via them to the tower.

Usually, these fixation means are realized by two fixation plates arranged in a bracket-like manner. When the tower is erected, these plates are in a vertical orientation. The respective frame ends are fixed to these bracket-like fixation plates by respective bolt connections, which bolts are fixed or screwed into respective bores in the fixation plates and the frame ends. Usually, the first frame ends are immovably fixed to the fixation means, while the second frame ends are fixed sliding relative to the fixation means, so that a relative motion is possible. This is necessary, as the tower shows a tendency to ovalize, when the damper module is installed in the tower.

For installing the damper or the slosh damper module the tower or the respective tower section is not erected, but lays on the ground in a horizontal position. In this position, the hollow cylindrical tower or tower section tends to ovalize due to the horizontal orientation and its weight. So, the tower or tower section moves from an original cylindrical cross-section to an oval cross-section. This has the effect, that the wall-mounted first and second fixation means are also moved relative to each other due to the ovalization and are changed in their orientation. While, when the tower or tower section is in an erected vertical position, the plate-like fixation means are all parallel to each other, the orientation relative to each other is somehow angled in the horizontal position due to the ovalization, which makes the installation of the damper module respectively the frame difficult. As mentioned, the plate-like fixation means are, when the tower is erected, in a vertical orientation. Thus, when the tower is laying on the ground, the plate-like fixation means are in a horizontal orientation and are, due to the ovalization, somehow shifted or angled to each other. For installing the damper module, the module is horizontally moved in the tower or tower section and the frame ends need to be pushed and inserted between the respective bracket-like fixation plates, two of which are arranged at opposite wall sides of the tower wall. Due to the angulation, it is necessary, that the two plates of each fixation means are sufficiently distanced to each other, so that there is enough space to move the frame end between the plates, necessitating relatively long fixation bolts. Furthermore, not only inserting the frame ends between the fixation plates is difficult, as this needs to be performed by a horizontal movement, also the matching of the respective bolt bores in the fixation plates and the frame ends is difficult, as the bores are difficult to see and as this area is difficult to be accessed.

SUMMARY

An aspect relates to an improved wind turbine.

For solving the problem, an inventive wind turbine as described above is characterized in that the first and second fixation means are first and second plates fixed to and extending horizontal from the inner wall, on which the first and second frame ends comprising flat support areas rest.

According to embodiments of the invention, the mechanical fixation of the frame ends to the fixation means is significantly improved. Referred to the tower being erected and in a vertical position, the first and second fixation means, which are fixed to the inner wall of the tower are first and second plates, which extend in a horizontal direction from the inner wall. Each fixation means is realized solely by one single plate, which provides in the vertical tower arrangement a horizontal attachment plane, to which or on which the respective first and second frame end can be attached. For attaching or connecting the frame ends to these horizontal plate planes, each first and second frame end comprises a flat support area, which support area rests on the respective plate. So, in the vertical tower arrangement the frame respectively the damper module rests on these horizontal fixation plates realizing a horizontal carrier plane.

This inventive fixation arrangement allows for a simplified installation of the damper module. As the plates are arranged in a horizontal orientation when the tower is vertical, the plates have a vertical orientation when the tower or tower section lays on the ground and is horizontally orientated. The damper module to be installed is horizontally moved towards these fixation plates, until the flat support areas of the first and second frame ends abut against the respective fixation plate. There is, as both elements which are fixed to each other, are flat respectively have flat connection surfaces, no need for inserting one element into another, as in the prior art, which is cumbersome and difficult. Rather it is only necessary to move the flat support areas against the flat plates and to then realize the respective fixation by the respective fixation elements, like bolts, brackets or the like, which will be explained in detail below.

As all relevant elements to be are fixed to each other are in a vertical orientation, the respective bores for accommodating fixation bolts, by which for example the first frame end is fixed to the first plates, the orientation of the respective holes can be seen in a horizontal view, which is easily possible for a worker, so that, first, the match of the holes in the fixation plate and the support area can be adjusted and visually inspected and, secondly, the bolts can easily be inserted in the respective matching bores. On the second frame side, the fixation of which allows for a certain sliding movement of the flat support areas relative to the second plates, which movement is necessary for balancing or compensating the change of shape from the oval form to the circular form when the laid down tower section is erected to a vertical position, is easily possible, as also here the respective elements to be connected and the respective connection areas are visible and the respective connection means like connections brackets etc. can easily be arranged.

After arranging or fixing the module respectively the module frame to the fixation plates the tower or tower section will be erected to a vertical position. This makes the tower or tower section change its shape from an oval shape to a circular shape. This change can, as already mentioned, easily be balanced in the second fixation area of the second frame ends to the second plates, where a sliding connection is realized allowing the second frame ends to move relative to the second fixation plates. The connection of the second frame ends to the second plates is adapted to allow for a certain movement, which is necessary at least in the plane, in which the flat support area rests on the flat plate plane, so that the maximum possible shape change can be balanced.

As mentioned, the module frame comprises at least two first and two second frame ends, which are parallel to each other with their support areas laying in the same plane, so that the first and second plates are also arranged in a common plane. In addition to these at least two first and second frame ends, it is possible that the frame comprises at least one further elongated first frame end and at least one further elongated second frame end arranged above the plane in which the first and second frame ends are arranged. These further first and further second frame ends may also preferably be fixed to respective further first and second plates fixed to the and extending horizontal from the inner wall, with each further first and second frame end comprising flat support areas. These further first and second frame ends and optional further first and second fixation plates provide a fixation or connection point or area above the fixation plane of the first and second frame ends to the first and second plates, so that at least three separate fixation points or fixation areas are realized on each frame side.

As mentioned, the support areas are flat, so that a flat connection area to the flat plate surface can be realized. In an inventive embodiment, the support areas are realized by support plates, which are provided at the respective frame end.

In this circumstance, preferably the frame comprises two horizontal beams and where applicable a further horizontal beam arranged above the two horizontal beams, each beam having a T- or H-shaped cross-section, the ends of each beam building the first and second frame ends and with a horizontal leg of each beam building the flat support area or support plate. According to this embodiment, the module frame comprises at least two, preferably three separate beams having a T- or H-shaped cross-section. Each beam therefore comprises at least one leg, which is, when the module is installed, parallel to the respective fixation plate. This leg is the respective support area or support plate. So, by using these T- or H-shaped beams, the realization of the respective support area is simple.

As mentioned, the two first plates and the two second plates are arranged in parallel to each other for spanning a common attachment plane. Although the respective two first and two second plates may be separate plates which are separately fixed to the inner wall, it is preferable according to another embodiment of the invention, that the two first plates and the two second plates are connected by connecting areas forming a respective one-piece plate element. So, both first plates are connected to each other forming a first one-piece plate element, while the two second plates are connected to each other forming a second one-piece plate element. The connection area preferably comprises a kind of cut-out, through which cut-out the further beam comprising the further first and second frame end can be moved when the damper module frame is installed. Having one-piece plate elements is advantageous, as only one piece needs to be handled and fixed to the tower wall for providing both separate fixation plates.

It is furthermore advantageous, that preferably the first and second plates and where applicable the further first and further second plates respectively the plate elements have a convex outer edge corresponding to the concave shape of the inner wall. The form of the respective plate or plate element corresponds to the form of the wall, both are rounded allowing for a good match of the edges to the wall and for a good fixation to the wall, which is usually realized by welding the respective plate or plate element to the wall.

In an embodiment the first and second plates and where applicable the further first and further second plates respectively the plate elements have at least one stiffening plate extending vertically from the plate bottom and preferably attached to the inner wall. This stiffening plate supports the plate or plate element against the wall and takes any tilting moment, so that the respective plate or plate element remains in its orientation even if the heavy load of the damper module rests on it.

As already mentioned, each first or further first frame end is preferably fixed to the respective plate by bolts. This allows for a simple but very firm and tight fixation of all first frame ends to the respective plates.

As also mentioned, the second or further second frame ends are fixed sliding relative to the respective second or further second plates. For allowing for a good sliding movement, it is preferable that a sliding element is arranged between the second plates and if applicable the further second plate and the respective support areas of the respective frame ends. This sliding element is an anti-friction element having good sliding properties. In an embodiment a plate or a pad or the like made of a polymer, for example TTFE, may be used.

In a preferred embodiment, the movement of the second frame ends, and if applicable of the further second frame end is restricted in opposing horizontal directions and in the vertical direction by a restriction means. This movement restriction refers to the vertical tower or tower section. So, the second or further second frame end can move in a horizontal plane to a certain degree for balancing any shape changes of the tower cross-section, and possibly, but not necessarily, also to a certain degree in the vertical direction, while in this direction no noticeable shape change occurs. By restricting the movement and fixing the respective frame end by this restriction means, a sufficient firm fixation is realized, allowing for a certain but restricted sliding movement.

In a preferred embodiment, the restriction means is a bracket fixed to the respective second plate or further second plate extending distanced along the sides of the respective frame and above the respective frame end. As the bracket is firmly fixed to the respective plate and encompasses the frame end respectively the end of the beam, the frame end respectively the beam is sufficiently fixed and restricted in its sliding movement to first securely fixing the whole damper module to the tower and secondly allowing for the respective sliding movement.

In a further detailed embodiment, the restriction means comprises two vertical side bars fixed to the respective second plate or further second plate and a horizontal bar or rod removably attached to the side bars. This modular restriction means or bracket allows for separately mounting the two vertical side bars to the respective plate after the frame ends are moved towards the respective plate and have reached their final orientation. Then, the horizontal bar or rod is attached to the side bars, which for example comprise respective bores accommodating the bar or rod. Nevertheless, it is also possible to first fix the horizontal bar or rod to the vertical side bars building the bracket and to then fix the bracket to the respective plate.

As mentioned, preferably a slosh damper module is used. Usually, such a slosh damper module comprises several second slosh tanks stacked above each other building a tank stack, with each slosh tank being filled with a liquid. The lowest, respectively the lower slosh tanks must be very stable and are made of pretty thick material or have different sizes compared to the upper slosh tanks, as the lowest or low slosh tanks carry the weight of the upper slosh tanks, with the lowest slosh tank carrying almost the entire weight of the tank arrangement. For providing a solution with the focus on providing an improved slosh tank arrangement, a further embodiment of the invention proposes that the slosh damper module comprises at least one lower slosh tank arrangement and at least one upper slosh tank arrangement arranged above the lower slosh tank arrangement, with each slosh tank arrangement comprising one or more, preferably circular, slosh tanks, the load of the lower slosh tank arrangement being directly taken by the frame, while the upper slosh tank arrangement is fixed to an intermediate frame carrying the load, which intermediate frame is fixed to the frame. The inventive slosh damper comprises a specific arrangement of the number of separate slosh tanks, which are divided into two groups, i.e., the lower and the upper slosh tank arrangements. Each arrangement comprises two or more separate slosh tanks. According to embodiments of the invention, these two slosh tank arrangements do not build a common tank stack, but build separate tank stacks, which are separately supported directly to the frame. The lower slosh tank arrangement is directly attached to the frame respectively its load is directly carried by the frame. The upper slosh tank arrangement rests on an intermediate frame, which intermediate frame is attached to the frame, so that the load of the upper slosh tank arrangement is also taken by the frame via the intermediate frame. The respective slosh tank in each respective arrangement stack therefore only needs to carry a smaller part of the overall slosh tank load, as the respective tank arrangements or tank sets are separated and the load is distributed. This allows for designing the respective lowest disk-shaped slosh tanks less complex.

The intermediate frame preferably comprises vertical support pillars fixed to the frame ends surrounding the, preferably circular, lower slosh tank arrangement, a horizontal frame structure comprising several horizontal struts with at least some of them being connected to a center ring, which in turn is fixed to a vertical center pillar extending through both upper and lower slosh tank arrangements and fixed to the frame. This respective pillar and strut arrangement allows for realizing a very stable intermediate frame. The horizontal frame structure, on which the upper slosh tank arrangement rests, may further comprise several support plates which are arranged at the upper structure side, on which plates the upper tank arrangement rests.

In an embodiment, each slosh tank arrangement comprises at least four stacked circular slosh tanks, preferably eight circular slosh tanks, whereby these numbers are not restricting, as also other numbers of respective tanks may be integrated into a respective tank arrangement.

While in some embodiments only one tank arrangement column comprising a lower tank arrangement and an upper tank arrangement may be useful, especially in larger wind turbines two such slosh tank arrangement columns arranged adjacent to each other may be provided, each slosh tank arrangement column comprising a lower and an upper slosh tank arrangement.

BRIEF DESCRIPTION

Some of the embodiments will be described in detail, with references to the following Figures, wherein like designations denote like members, wherein.

DETAILED DESCRIPTION

Figure 1:
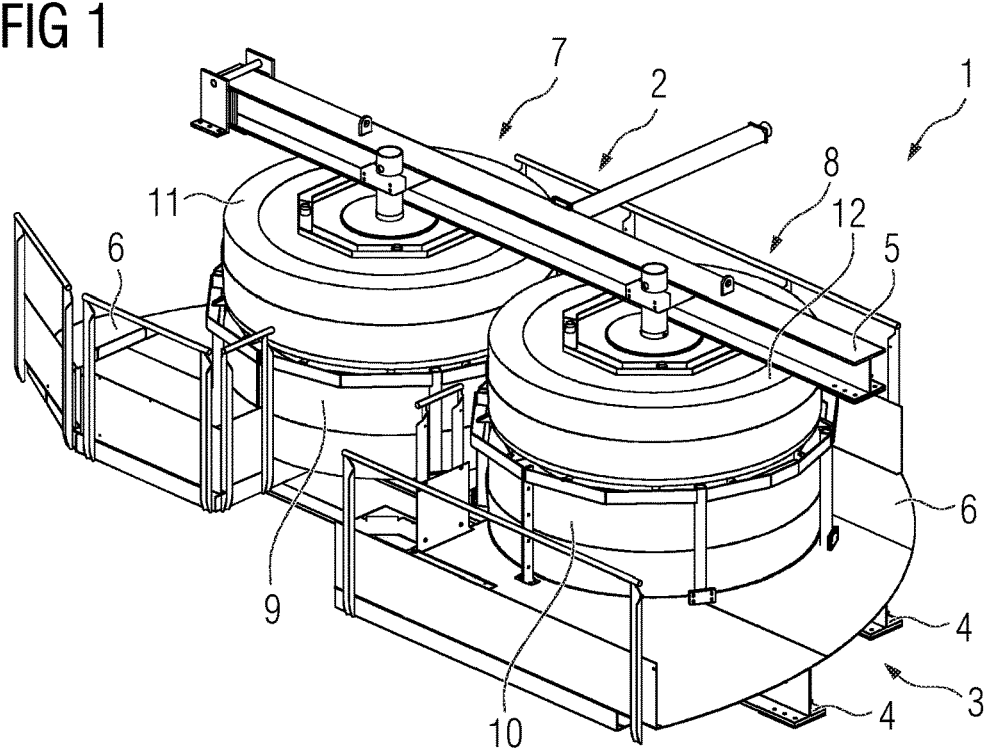
FIG. 1 shows a principle perspective view of a damper module in form of a slosh damper module.

FIG. 1 shows a damper module 1 in form of a slosh damper module 2 adapted to be installed in the inner part of a tower or tower segment of a wind turbine. The slosh damper module 2 comprises a frame 3 with two lower first beams 4 being arranged in a common plane and with an upper beam 5 being arranged above the beams 4. Each beam 4, 5 has a H-shaped cross-section. On the lower beams 4, supporting plates 6 as part of the frame 3 are arranged, on which two slosh tank arrangement columns 7, 8, each comprising a lower slosh tank arrangement 9, 10 and an upper slosh tank arrangement 11, 12 are supported. Each slosh tank arrangement 9, 10, 11, 12 comprises several separate circular slosh tanks stacked above each other. The setup of the slosh tank arrangement column 7, 8 will be explained in detail with reference to FIGS. 10 and 11.

Figure 2:
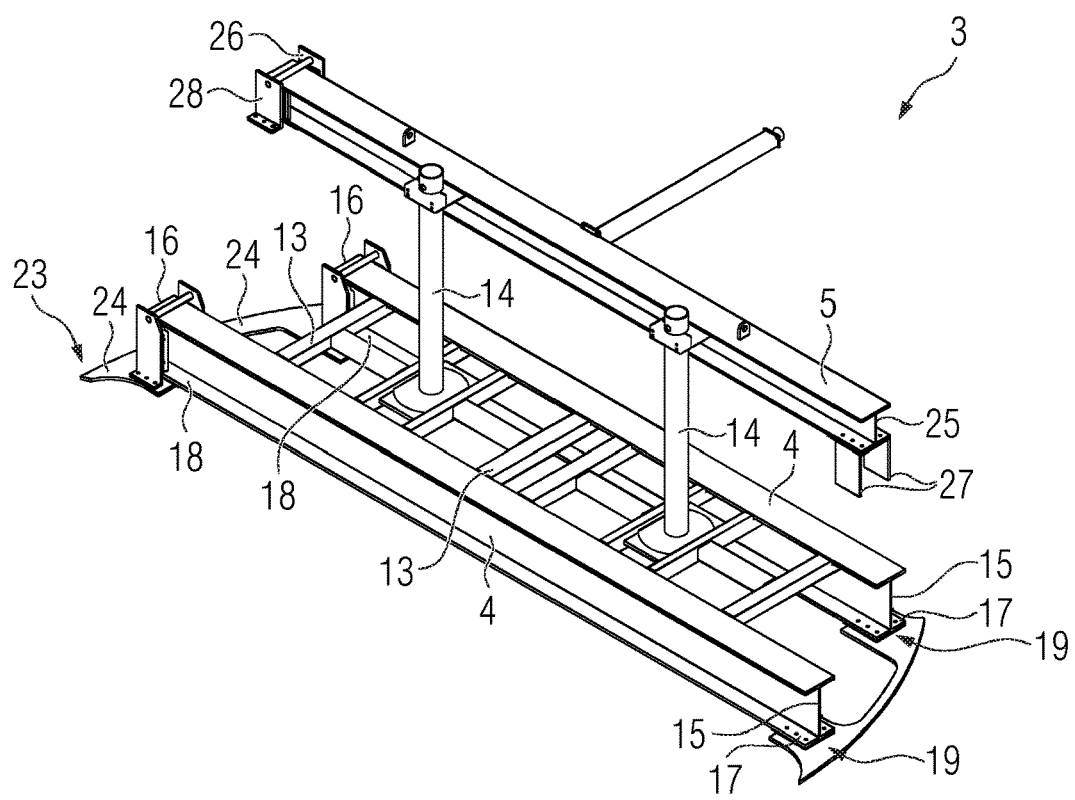
FIG. 2 shows a perspective view of the frame of the damper module of FIG. 1.

FIG. 2 shows a perspective view of the frame 3. The lower H-beams 4 are connected by several struts 13. One beam 4 is longer than the other beam 4, as the frame 3 is not arranged in the center of the tower, but shifted to the side, as will be obvious from FIG. 3.

The upper beam 5 is connected to the lower beam 4 respectively the arrangement of the struts 13 by two center pillars 14 extending through the slosh tank arrangements 9, 10, 11, 12 as will be explained later.

Figure 3:
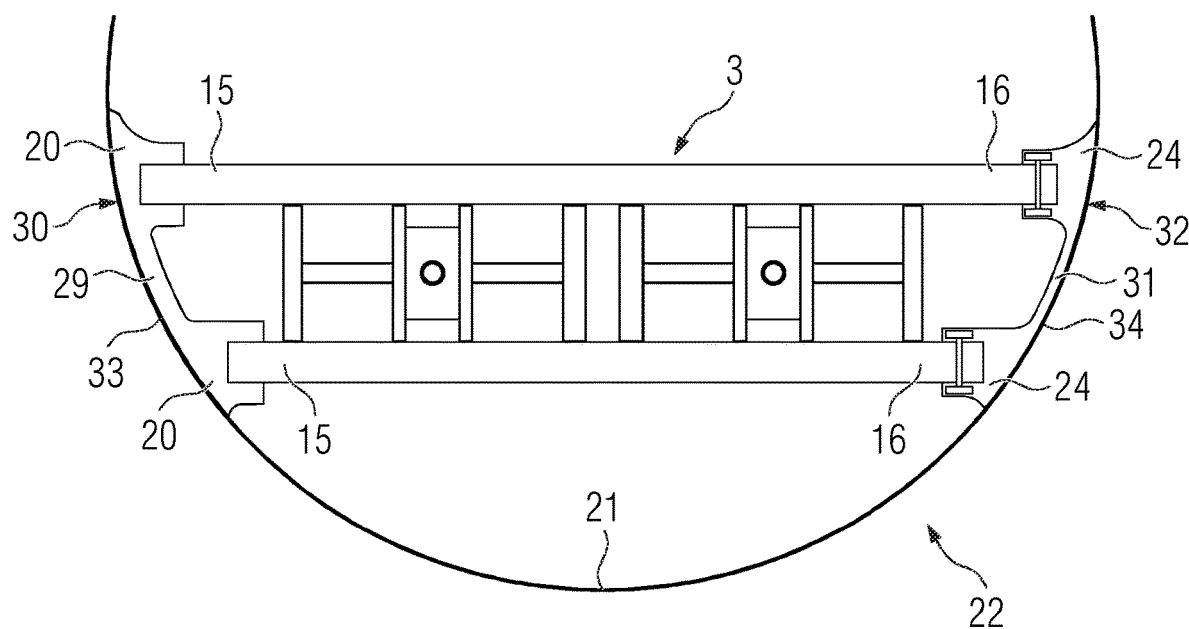
FIG. 3 shows a principle view, in part, of a tower or tower section with the mounted damper of FIG. 1, whereby only the frame is partially shown in FIG. 3.

The frame 3 has two elongated first frame ends 15 realized by one end of the respective beams 4, and two second frame ends 16 realized by the respective other end of the beams 4. Each first and second frame end 15, 16 comprises a flat support area 17, 18. The support areas 17 of the first frame ends 15 rest, when the frame 3 is mounted, on first fixation means 19 in form of flat plates 20 fixed to the inner wall 21 of a tower 22 or a tower segment as will be explained with regard to FIG. 3. The second frame ends 16 respectively the second support areas 18 are slidingly fixed to second fixation means 23 in form of plates 24 which are also fixed to the inner wall 21, but at the opposite wall side as shown in FIG. 3. While the first support areas 17 are immovably fixed to the first plates 20, the second support areas 18 are fixed sliding relative to the plates 24, they can therefore move along the plane of the respective plates 24.

The upper beam 4 also comprises a further elongated first frame end 25 and on the other side of the beam a second further elongated frame end 26. Also, these frame ends 25, 26 are firmly attached to the inner wall 21. This can either also be done by respective plates like the plates 20, 24 fixed to the inner wall 21, or by directly attaching the ends 25, 26, to which respective welding plates 27, 28 are attached to the wall 21 by welding the welding plates 27, 28 after the tower is erected.

FIG. 3 shows a partial principle view of the tower 22 or the tower section. The plates 20 are connected by a connection area 29 to form a one-piece plate element 30, which can be handled easily, and which can be attached in a single attachment procedure providing both plates 20 in their mounting position. The same is true for the plates 24, also they are connected by a connection area 31 for building a one-piece plate element 32. As is obvious from FIG. 3, but also from FIGS. 4 and 5, the outer edge 33 of the one-piece plate element 30 and the outer edge 34 of the one-piece element 32 are rounded corresponding to the rounded shape of the inner wall 21, so that they have a form match.

FIG. 3, which shows a top view on the mounted frame 3, from which only the lower beams 4 are displayed, the first and second frame ends 14, 15 rest on the respective plates 20, 24 with their support areas 17, 18 resting on the respective plate surface. As already mentioned, the first frame ends 15 are fixed immovable to the plates 20, while the second frame ends 16 are fixed sliding to the plates 24, which will be disclosed in detail later on.

Figure 4:
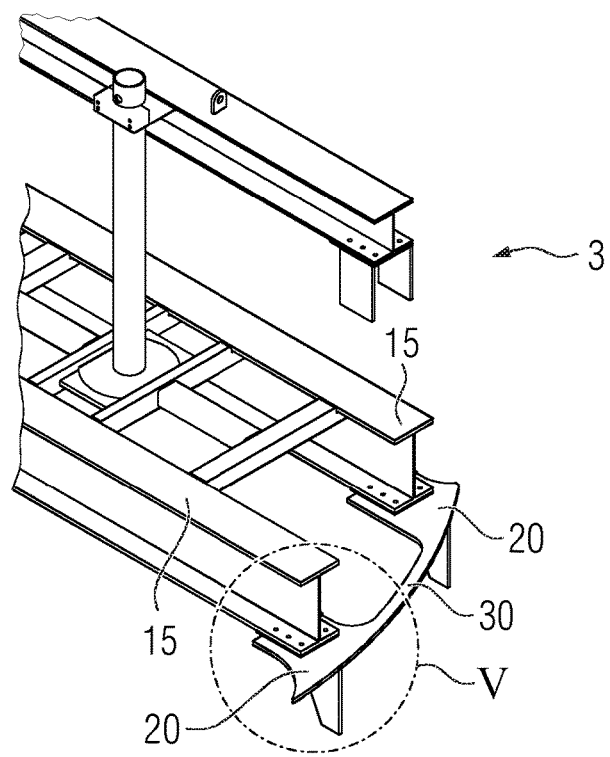
FIG. 4 shows a perspective partial view of the side of the frame with the first ends attached to first plates.
Figure 5:
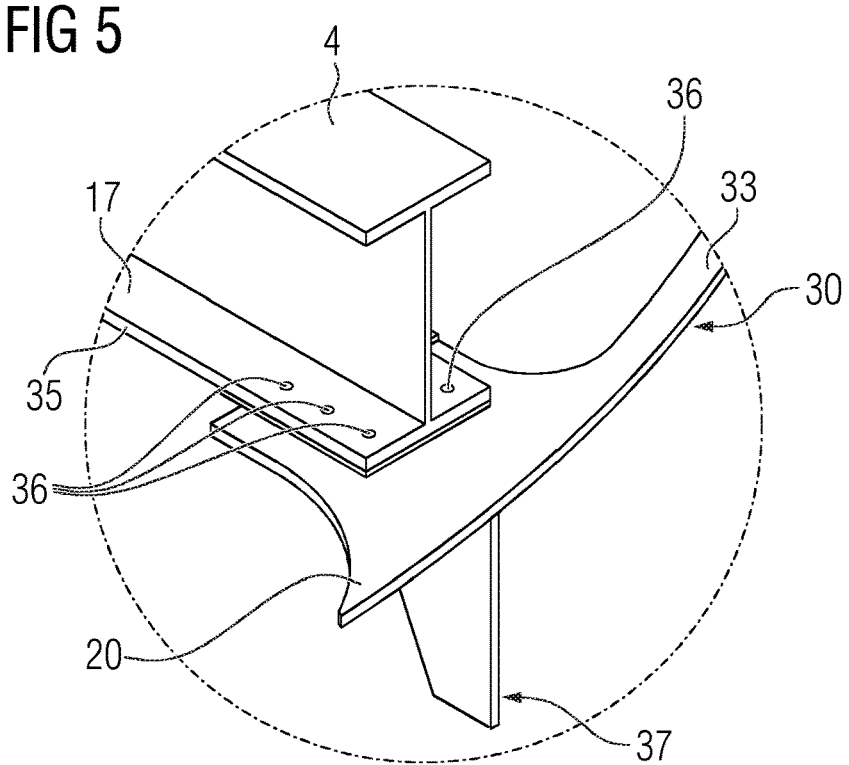
FIG. 5 shows an enlarged view of the connection of a first end to a first plate.

FIG. 4 shows a perspective partial view of the frame 3 with the first frame ends 15 and the one-piece plate element comprising the two plates 20, while FIG. 5 shows an enlarged view of the area V in FIG. 4. As especially FIG. 5 shows, the support area 17 is realized by the lower leg 35 of the H-beam 4. This leg 35 provides a flat support surface and rests on the surface of the plate 20. Several bores 36 in the leg 35 are shown, which match with respective bores in the plate 20, through which bores respective bolt connections extend, which are not shown in detail.

Figure 6:
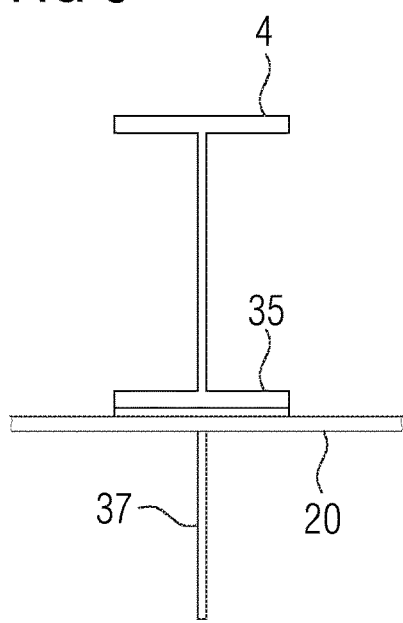
FIG. 6 shows a cross-section of the connection of FIG. 5.

A cross-sectional view is shown in FIG. 6 showing the flat arrangement of the leg 35 on the flat plate 20. As can further be taken from FIGS. 5 and 6, a stiffening plate 37 is attached to the bottom of the plate 20 and is preferably directly connected or welded to the inner wall 21 for supporting the mechanical connection and avoiding any tilting movement of the plate 20 when the damper 1 is fixed.

In the way described above, both ends 15 are fixed to the respective plates 20, so that the frame 3 is firmly and immovably fixed on this first frame side.

Figure 7:
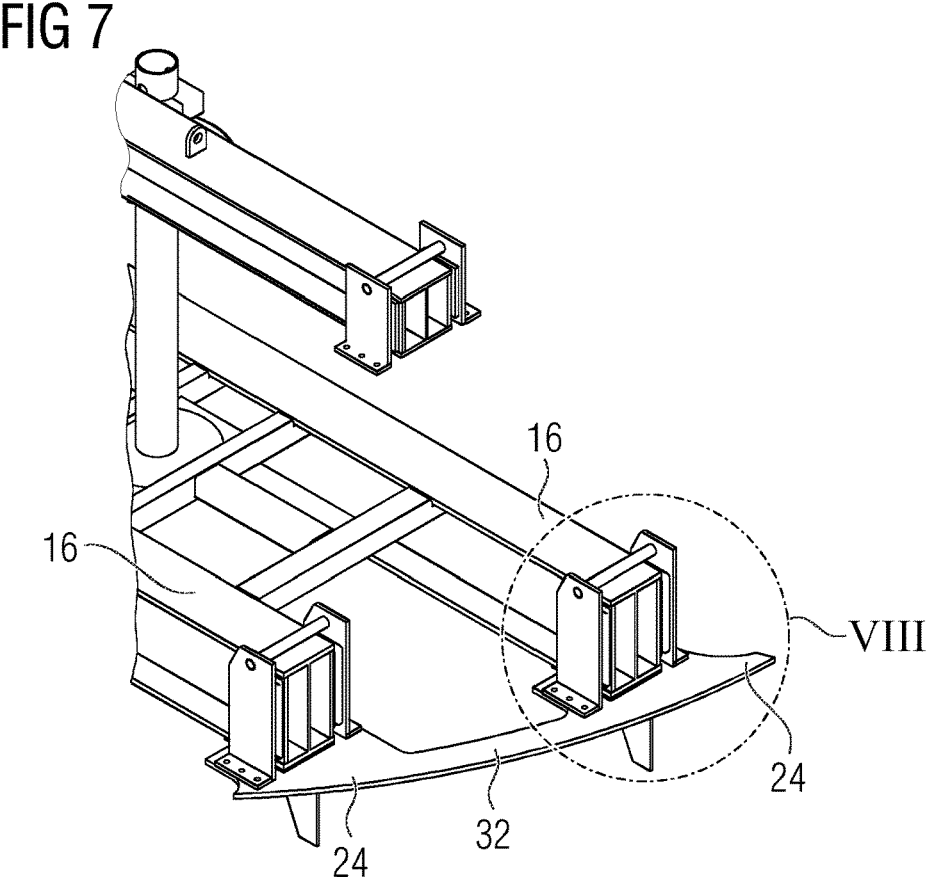
FIG. 7 shows a perspective partial view of the second frame ends connected to second plates.

As mentioned, the second frame ends 16 are fixed sliding to the respective plated 24, which are also connected to a common one-piece plate element 32 as shown in FIG. 7. Also, here, see FIG. 8, the H-shaped beam 4 certainly comprises a lower leg 35, which certainly extends along the entire beam length. This leg 35 provides the second support area 18. Between the surface of the plate 24 and the surface of the leg 35 a sliding element 38 in form of a plate or a pad made of a polymer, e.g., PTFE, 15 arranged. This antifriction element allows for a good sliding movement of the second frame end 16 relative to the plate 24.

For restricting this movement each second frame end 16 is provided with a restriction means 39 for restricting the movement on the respective plate 24. This restriction means 39 is a bracket which comprises two vertical side bars 40, which may be double layered, and which are fixed to the plate 24 by respective bolt connections, which are not shown in detail. These side bars 40 extend distanced to the beam 4 respectively the second frame end 16, so that the frame end 16 can move in the horizontal plane along the respective plate 24 until it abuts the respective side bar 40. Further, the restriction means 39 comprises a bar or rod 41 connecting both side bars 40 and extending above the respective frame end, so that also a vertical movement up to a certain degree is possible, while this vertical movement is not very likely.

Figure 9:
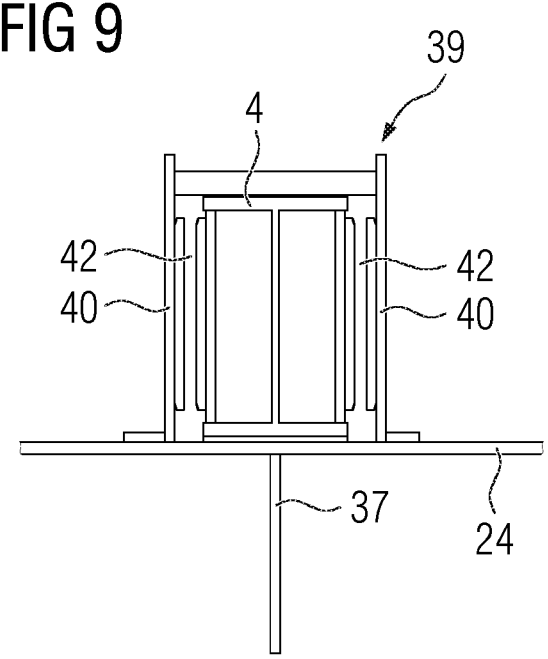
FIG. 9 shows a cross-sectional view of the connection of FIG. 8.

FIG. 9 shows a cross-sectional view of the restriction means 39, from which view it is obvious that the side bars 40 are arranged with a certain gap to the beam 4, at which on both sides respective abutting bars 42 may be attached, which run against the respective side bars 40 for restricting the movement.

Figure 8:
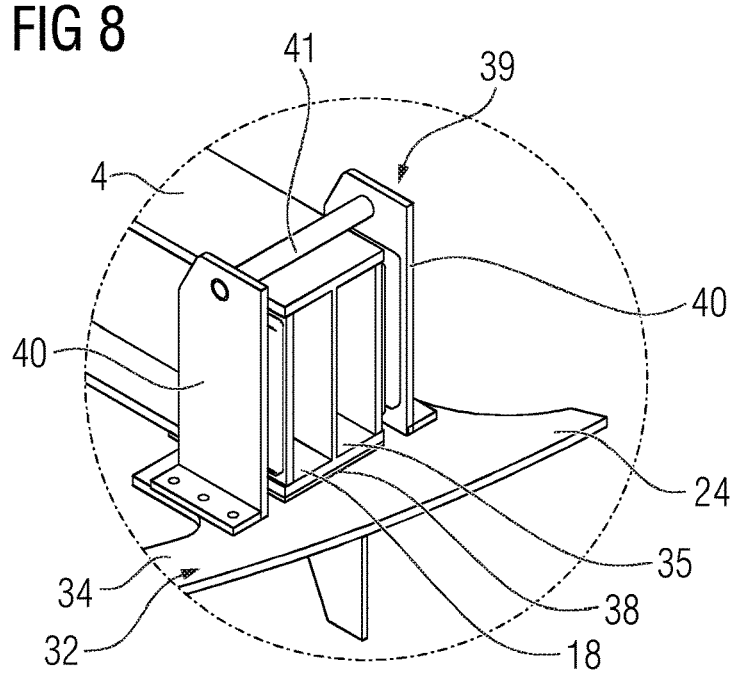
FIG. 8 shows an enlarged view of the connection of a second end to a second plate.

The installation of the slosh damper module 2 restrictively the frame 3 with one fixed side and one sliding side is necessary, as the module 2 respectively the frame 3 is mounted with the tower 22 or the tower section laying on the ground in a horizontal direction. In this arrangement, the plates 20, 24 extend in a vertical direction, the module 2 is moved in a horizontal direction towards the plates 20, 24 so that the respective flat support areas 17, 18 are moved against the plates 20, 24. Then, the respective bolts for fixing the first frame ends 15 to the plates 20 are mounted, whereafter the respective restriction means 39 in form of the bracket as shown in FIG. 8 are mounted for fixing the second frame ends 16.

As the tower 22 rests on the ground it tends to change its circular cross-section to an oval cross-section due to the weight of the tower 22. Even with a slightly oval cross-section it is easily possible to install the respective plates 22, 24 respectively the one-piece plate elements 30, 32 at the respective wall position and to mount the frame 3, as the sliding arrangement of the frame 3 on the plates 24 allows for balancing a change of the tower cross-section when it is erected. It is easily possible to arrange the frame 3 with the bores 26 in the legs 35 matching the respective bores in the plates 20, so that the bolts can easily be introduced in the matching bores and be tightly fixed, as all corresponding planes are vertical and the bolts can be fixed with a horizontal orientation. On the other side, the restriction means 39 respectively the bracket can easily be fixed to the respective plate 24. As the respective restriction means 39 respectively the bracket is distanced to the respective frame end 16, each frame end can move in the plane of the plates 24, when the tower 22 is erected, resulting in a change from the oval cross-section to the circular cross-section and therefore with a certain relative movement of the plates 20 and 24 relative to each other. As the frame 3 is fixed to the plates 20, this form change is balanced by the sliding connection of the second frame ends to the plate 24.

The inventive connection of the module 2 respectively the frame 3 to the plates 20 and 24 is not only advantageous while erecting the tower, but it makes the whole structure stable at any stage or in any process, in which the orientation or cross-section of the tower 22 or the tower section changes. This is during installation, during a tower section rotation, when the section undergoes a certain rotation, during land transportation, during the erection, during the transport like the sea transport, and during operation. In these phases, the tower or tower section orientation may either be horizontal or vertical or change from horizontal to vertical. Nevertheless, any kind of form or cross-section change of the tower does not negatively influence the module or frame connection, which is in each and every situation able to balance any form or cross-section change.

Figure 10:
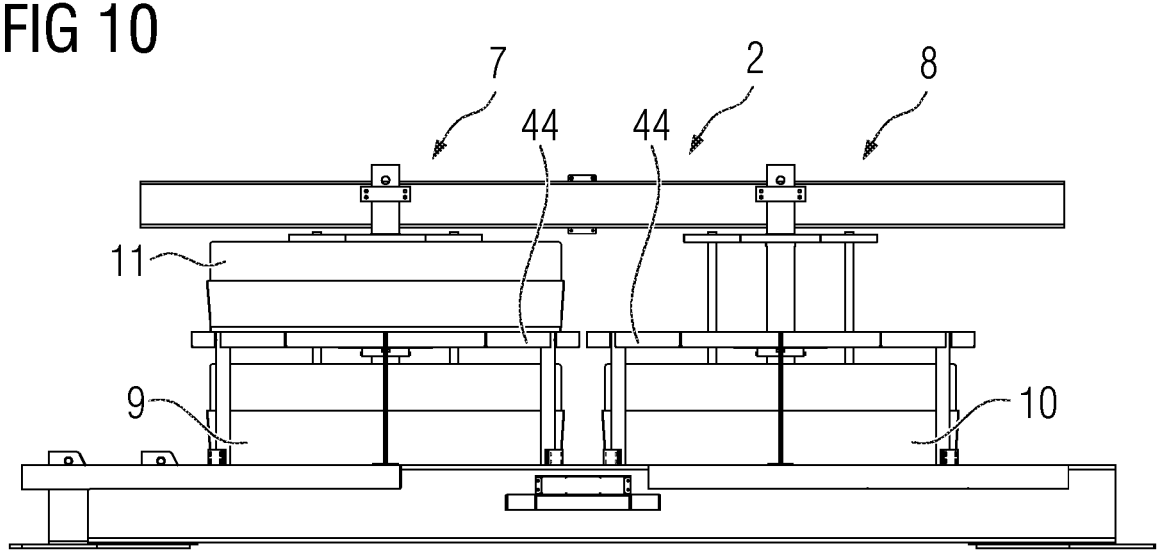
FIG. 10 shows a side view of the damper module with two slosh tank arrangement columns, each comprising a lower and an upper slosh tank arrangement, with one column shown only with the lower arrangement.
Figure 11:
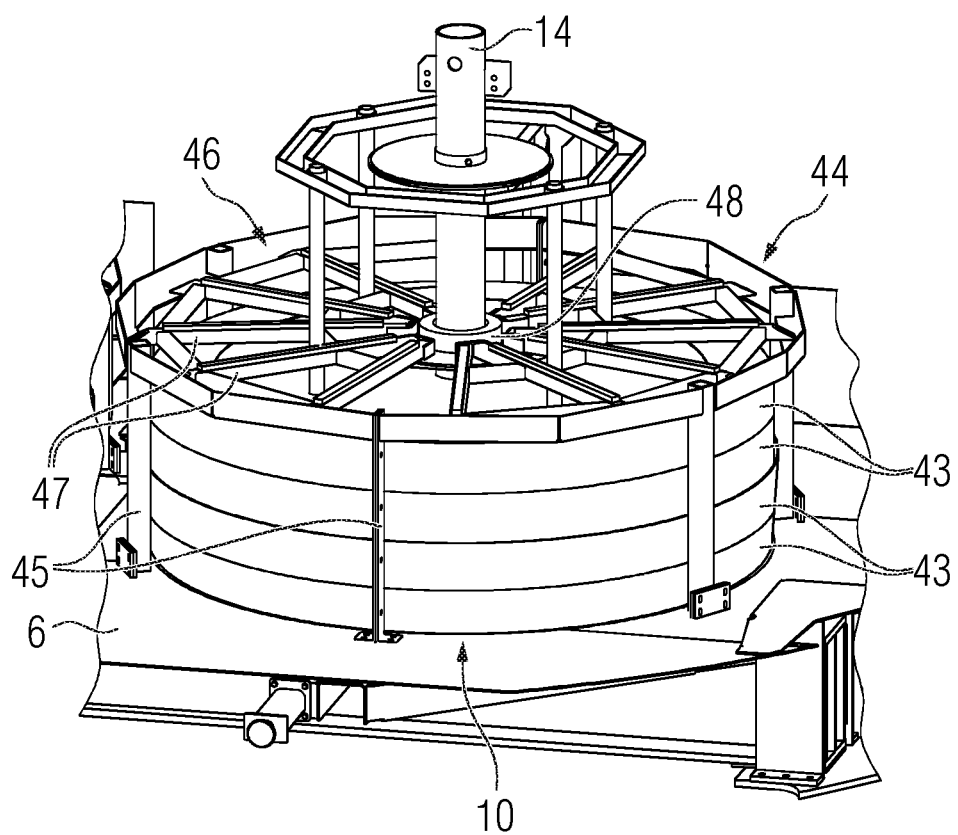
FIG. 11 shows a perspective partial view of the damper of FIG. 10 of the area with only the lower slosh tank arrangement.

FIGS. 10 and 11 show in detail the slosh damper module 2 with the slosh tank arrangement columns 7 and 8. As mentioned, the slosh tank arrangement column 7 comprises a lower slosh tank arrangement 9 and an upper slosh tank arrangement 11, while the slosh tank arrangement column 8 comprises the lower slosh tank arrangement 10 and the upper slosh tank arrangement 12, the later one not shown in FIGS. 10 and 11. Each slosh tank arrangement 9, 10, 11, 12 comprises several circular slosh tanks, which are stacked above each other. Only as an example, FIG. 4 shows four circular slosh tanks 43 stacked above each other. In an embodiment, each slosh tank arrangement 9, 10, 11, 12 comprises eight slosh tanks 43, so that with two columns 7, 8 in total 32 slosh tanks 43 are provided.

As is already obvious from FIG. 10, the slosh tank arrangements 9 and 11 and 10 and 12 are distanced to each other. While the slosh tank arrangements 9, 10 rest directly on the lower beams 4 respectively the support plates 6, the upper slosh tank arrangements 11, 12 are arranged on respective intermediate frames 44, which in turn are fixed to the lower beams 4 respectively the support plates 6.

FIG. 11 shows a perspective view of such an intermediate frame 44. It comprises several vertical support pillars 45 fixed to the frame 3 respectively the support plates 6 being a part of the frame 3. The support pillars 45 surround the lower slosh tank arrangement 10. Attached to the vertical support pillars (the term "vertical" here refers to the situation when the tower 22 is erected to a vertical position) is a horizontal frame structure 46 comprising several horizontal struts 47, which are connected to a center ring 48. The center ring 48 in turn is attached to the center pillar 14.

When the upper slosh tank arrangement 12 is mounted, this arrangement 12 solely rests on the intermediate frame 44 respectively on the horizontal frame structure 46 and via the vertical support pillars 45 on the frame 3 respectively the support plates 6, but not on the lower slosh tank arrangement 10. This allows for designing the respective lowest slosh tank 43 of the lower slosh tank arrangement 9, 10 less complex, as it only needs to take the weight of the few slosh tanks 43 of the lower arrangement 9, 10, but not also the weight of the slosh tanks 43 of the upper arrangement 11, 12.

Due to the intermediate frame 24 the weight of the upper slosh tank arrangement 11 and 12 can be distributed and can be separately loaded to the frame 3 respectively the support plates 6, but not to the lower slosh tank arrangements 9, 10.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising:
   a tower; and
   a damper module arranged in the tower, the damper module comprising a frame with at least two elongated first frame ends at one side of the frame and at least two elongated second frame ends at the opposite side of the frame, the at least two elongated first frame ends being fixed to a first fixation means arranged at an inner wall of the tower, and the at least two elongated second frame ends being fixed to a second fixation means arranged at the inner wall of the tower;
   wherein the at least two elongated first frame ends are immovably fixed to the first fixation means while the at least two elongated second frame ends are fixed sliding relative to the second fixation means;
   wherein the first fixation means is a first plate fixed to and extending horizontal from the inner wall, and the second fixation means is a second plate fixed to and extending horizontal from the inner wall, on which the at least two elongated first frame ends and the at least two elongated second frame ends comprising flat support areas rest, respectively.

2. The wind turbine according to claim 1, wherein the frame comprises at least one further elongated first frame end and at least one further elongated second frame end, which further first and second frame ends are arranged above a plane in which the at least two elongated first frame ends and the at least two elongated second frame ends are arranged and are also fixed to respective further first and second plates that are each fixed to an and extending horizontal from the inner wall, further wherein each further first and second frame end comprising flat support areas.

3. The wind turbine according to claim 1, wherein the support areas are realised by support plates.

4. The wind turbine according to claim 1, wherein the frame comprises two horizontal beams, and a further horizontal beam arranged above the two horizontal beams, having a T- or H-shaped cross section, the ends of each beam building the first and second frame ends respectively the further first and second frame ends and with a horizontal leg of each beam building the flat support area or support plate.

5. The wind turbine according to claim 1, wherein the two first plates and the two second plates are connected by a connection area forming a respective one-piece plate element.

6. The wind turbine according to claim 1, wherein the first plate and the second plate, and a further first and a further second plate, all have a convex outer edge corresponding to a concave shape of the inner wall.

7. The wind turbine according to claim 1, wherein the first plate and the second plate, and a further first and a further second plate, have at least one stiffening plate extending vertically from a plate bottom and attached to the inner wall.

8. The wind turbine according to claim 1, wherein each frame end is fixed to the respective plate by bolts.

9. The wind turbine according to claim 1, wherein a sliding element is arranged between the second plate and the support areas.

10. The wind turbine according to claim 9, wherein the sliding element is a plate or pad made of a polymer.

11. The wind turbine according to claim 1, wherein a movement of the at least two elongated second frame ends is restricted in opposing horizontal directions and in a vertical direction by a restriction means.

12. The wind turbine according to claim 11, wherein the restriction means is a bracket fixed to the respective second plate or further second plate extending distanced along sides of the respective frame end and above the respective frame end.

13. The wind turbine according claim 12, wherein the restriction means comprises two vertical side bars fixed to the respective second plate or further second plate and a horizontal bar or rod removably attached to the side bars.

14. The wind turbine according to claim 1, wherein the damper module comprises at least one lower slosh tank arrangement and at least one upper slosh tank arrangement arranged above the lower slosh tank arrangement, with each slosh tank arrangement comprising one or more circular, slosh tanks, a load of the lower slosh tank arrangement being directly taken by the frame, while the upper slosh tank arrangement is fixed to an intermediate frame carrying a load which intermediate frame is fixed to the frame.

15. The wind turbine according to claim 14, wherein the intermediate frame comprises vertical support pillars fixed to the frame and surrounding the lower slosh tank arrangement, a horizontal frame structure comprising several horizontal struts with at least some of them being connected to a center ring which is fixed to a vertical center pillar extending through both upper and lower slosh tank arrangements and fixed to the frame.

16. The wind turbine according to claim 14, wherein each slosh tank arrangement comprises at least four stacked circular slosh tanks.

17. The wind turbine according to claim 14, wherein two slosh tank arrangement columns arranged adjacent to each other are provide, each slosh tank arrangement column comprising a lower and an upper slosh tank arrangement.

* * * * *